United States Patent [19]

Dove et al.

[11] Patent Number: 4,950,197
[45] Date of Patent: Aug. 21, 1990

[54] MODULAR ROTARY MOTION TOY

[75] Inventors: Timothy T. Dove, Clarkston; Roger L. Schlaifer, Atlanta, both of Ga.

[73] Assignee: Schlaifer Nance & Co., Inc., Atlanta, Ga.

[21] Appl. No.: 404,189

[22] Filed: Sep. 7, 1989

[51] Int. Cl.$^5$ .......................................... A63H 33/08
[52] U.S. Cl. .................................... 446/103; 434/401
[58] Field of Search ............... 446/103, 102, 118, 121, 446/120; 434/401

[56] References Cited

U.S. PATENT DOCUMENTS

| | | | |
|---|---|---|---|
| 2,692,443 | 10/1954 | Milligan | 434/401 |
| 2,882,617 | 4/1959 | Godfrey | 446/121 X |
| 2,994,154 | 8/1961 | McCaa | 446/90 |
| 3,704,527 | 12/1972 | Berkman | 434/401 |
| 3,881,274 | 5/1975 | Kanda | 446/103 |
| 3,965,610 | 6/1976 | Den Ouden | . |
| 4,109,398 | 8/1978 | Hida | 446/90 X |
| 4,124,949 | 11/1978 | Bach et al. | . |
| 4,253,268 | 3/1981 | Mayr | 446/104 |
| 4,813,903 | 3/1989 | Furukawa et al. | 446/103 X |

Primary Examiner—Mickey Yu
Attorney, Agent, or Firm—Foley & Lardner, Schwartz, Jeffery, Schwaab, Mack, Blumenthal & Evans

[57] ABSTRACT

A modular crank toy includes a group of interchangeable elements which may be arranged creatively in multiple patterns. Rotary motion is transmitted from a drive unit with a crank handle to the other elements to provide entertaining and educational animated movements throughout various branches of the system assembled by the user. The movement is exhibited through a variety of different animated display-producing elements which rotate about their axes. Branches and circuits are created by joining such multiple, different animated display-producing elements together through a variety of junction units through which the rotational movement is transmitted.

17 Claims, 10 Drawing Sheets

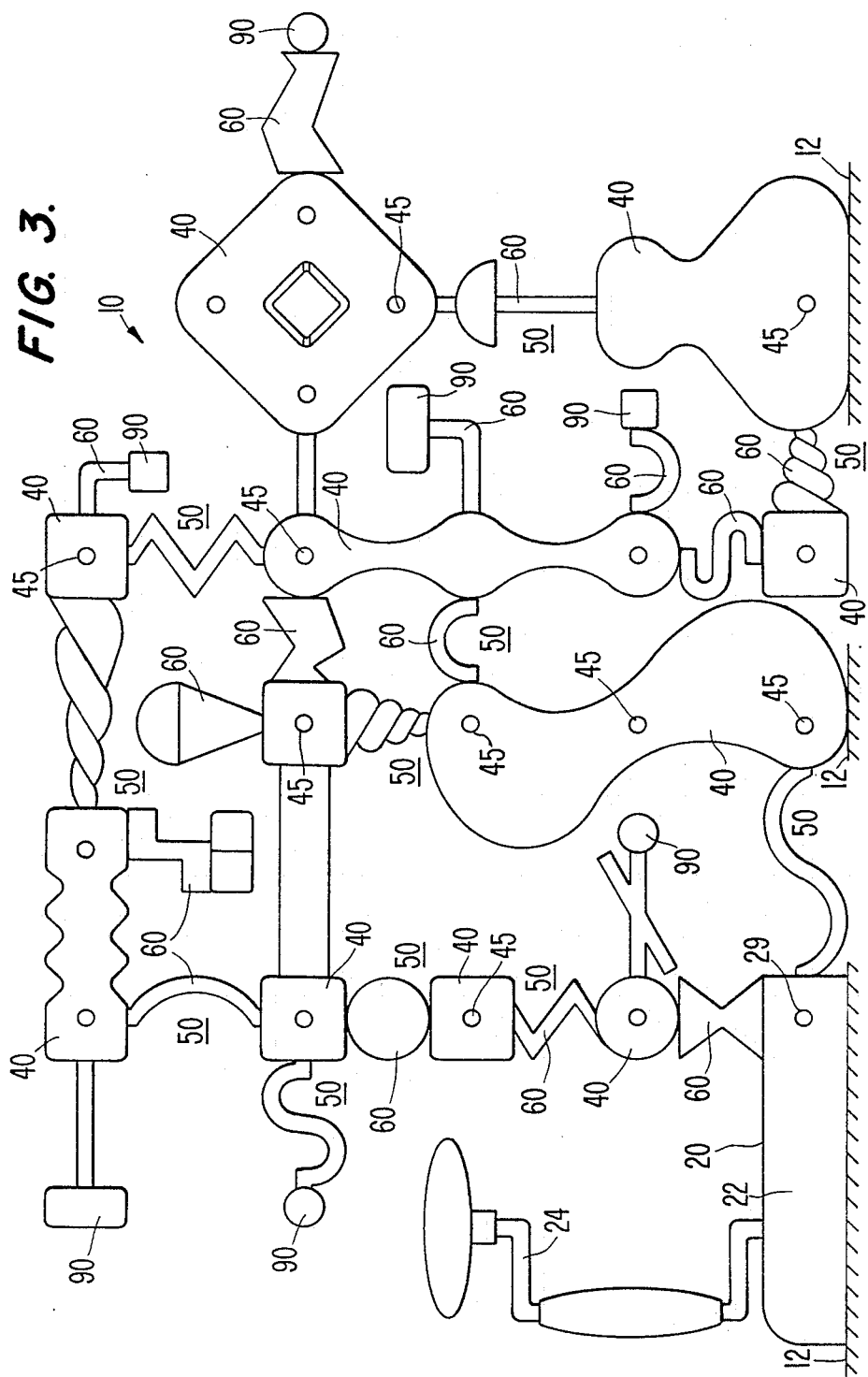

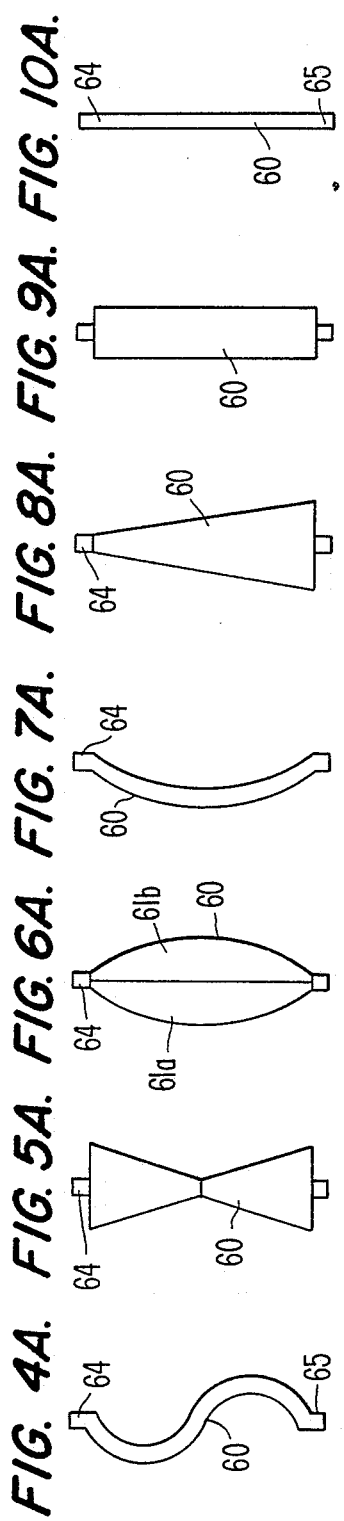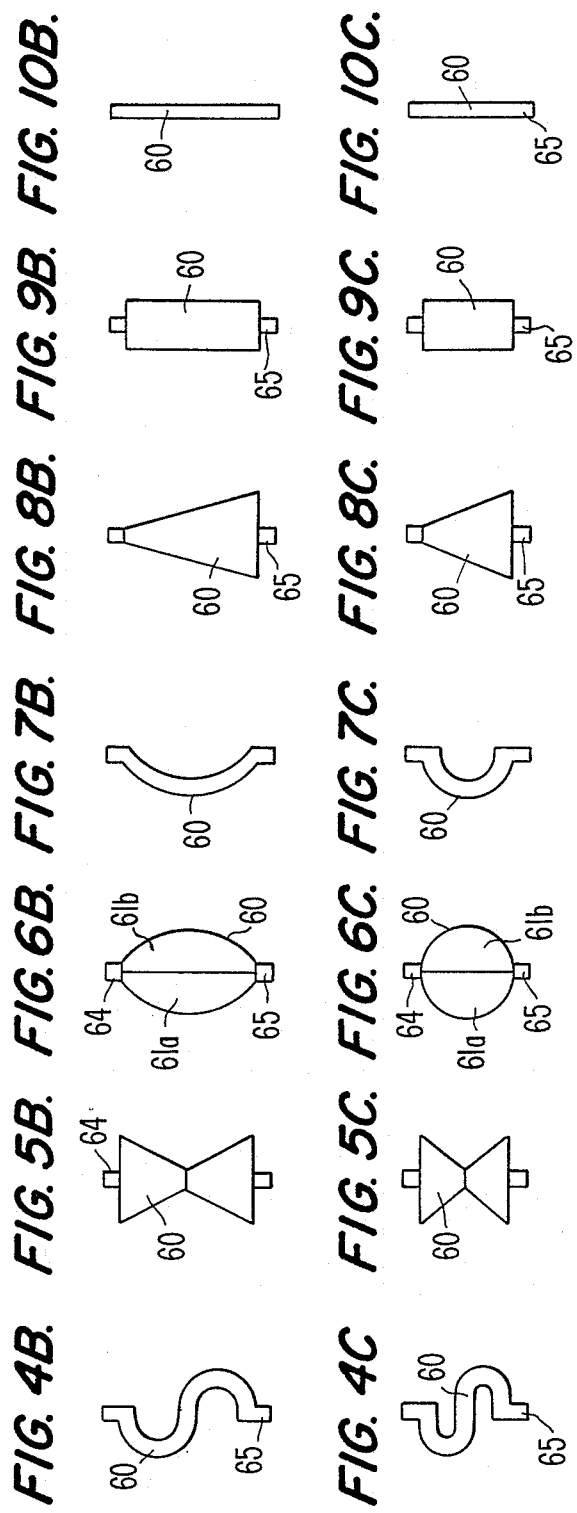

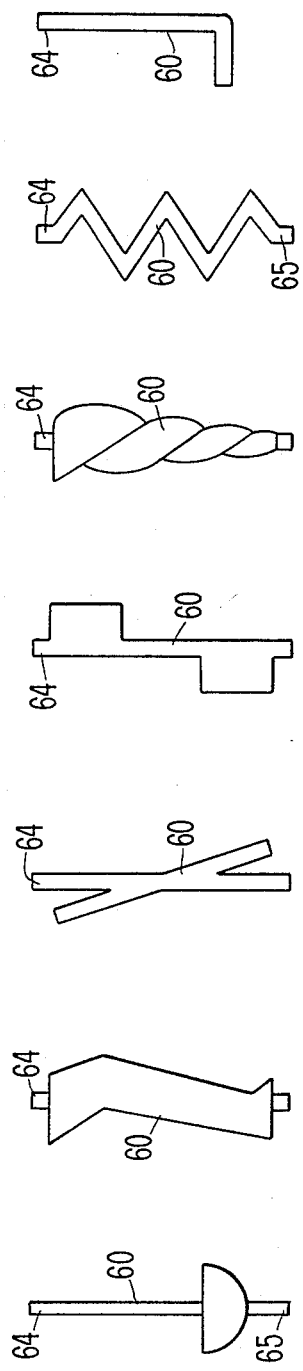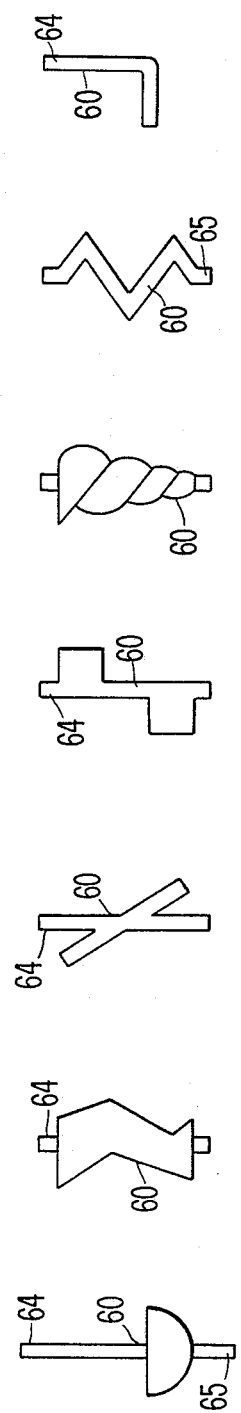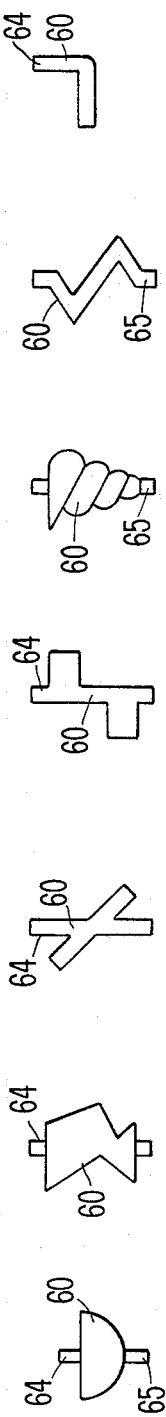

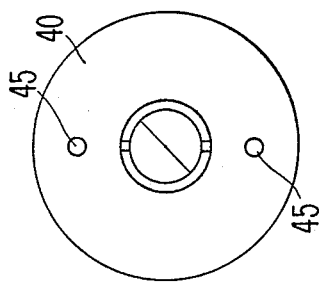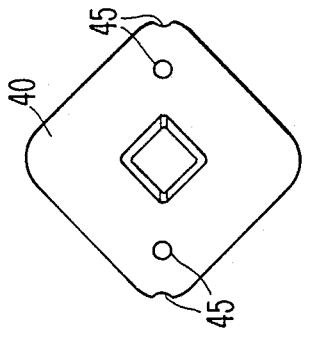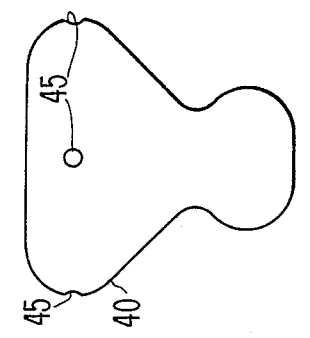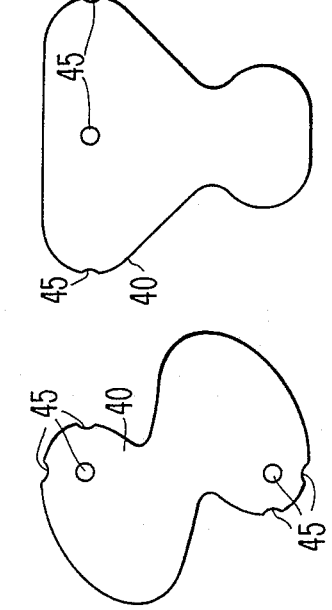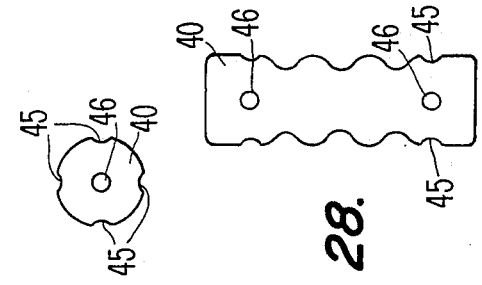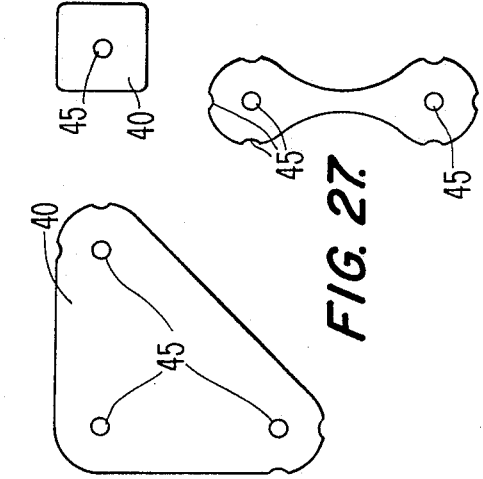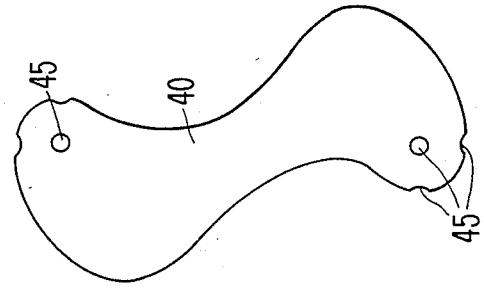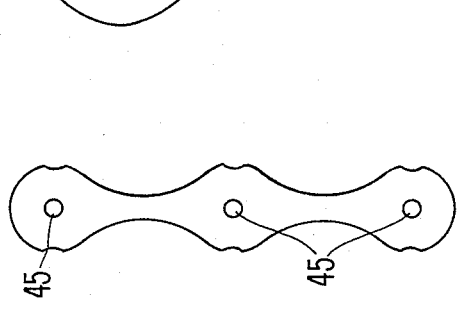

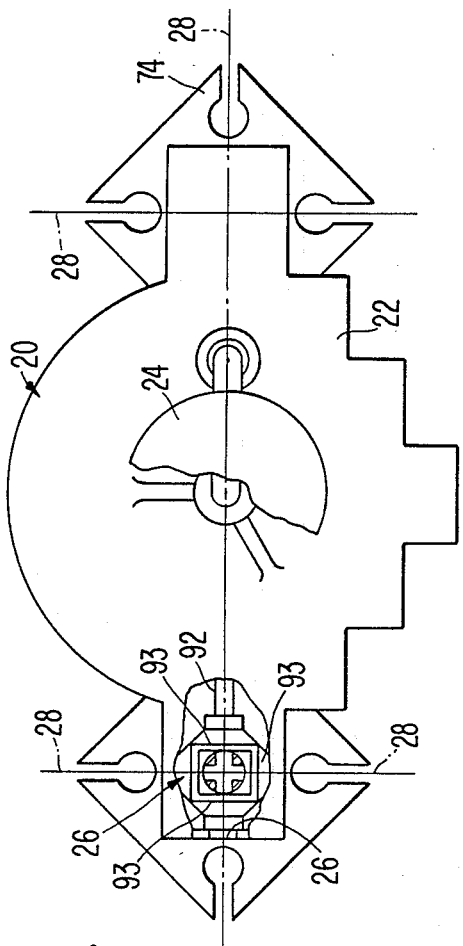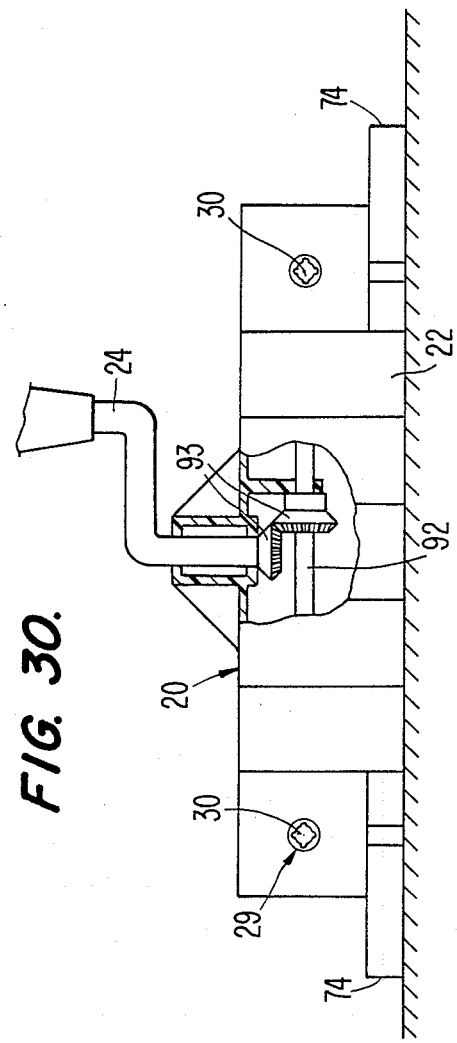

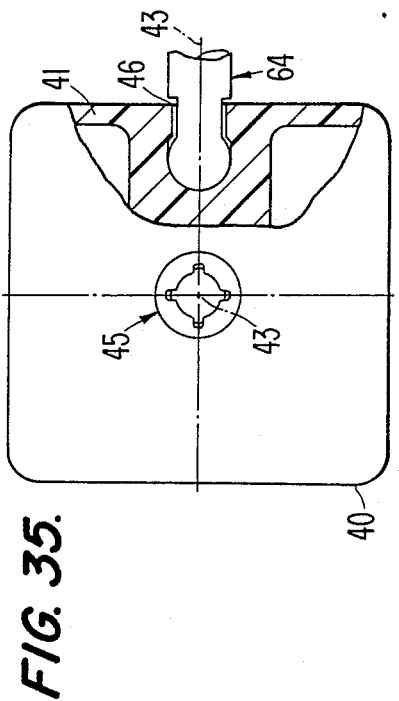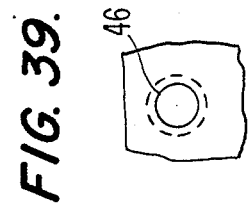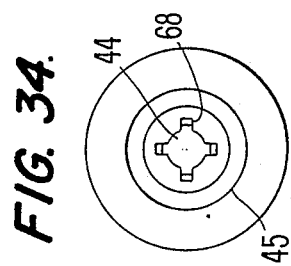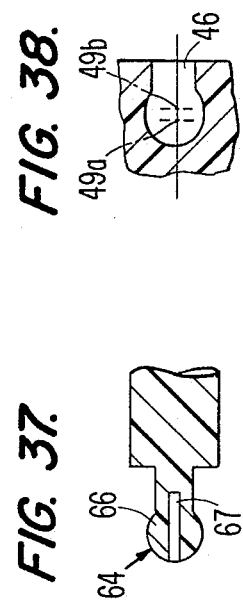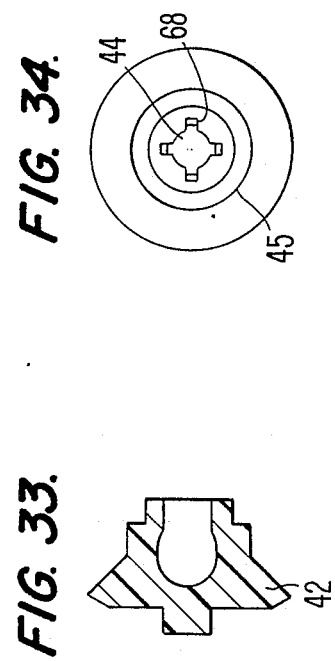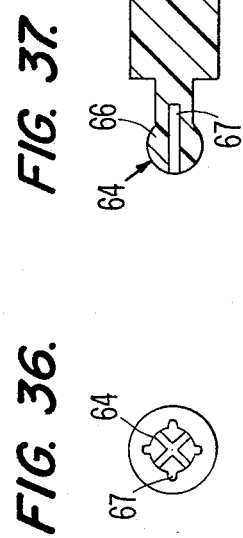

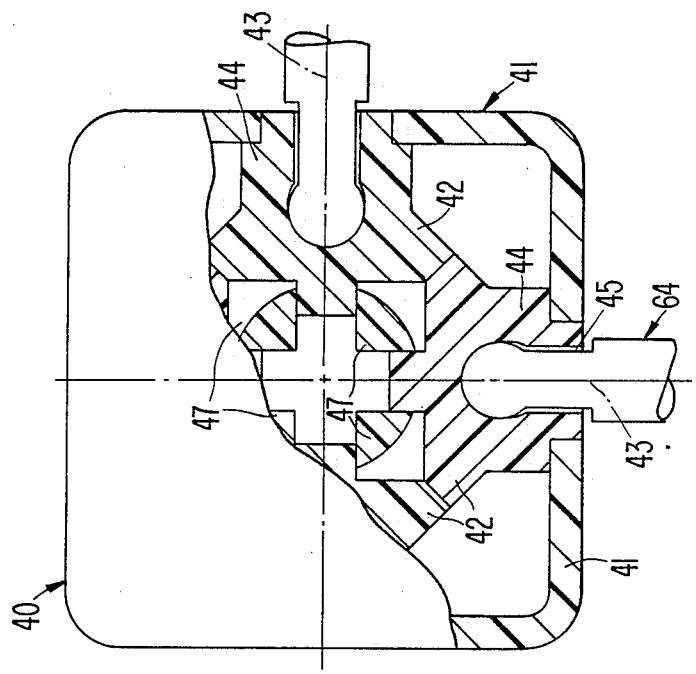

MODULAR ROTARY MOTION TOY

BACKGROUND OF THE INVENTION

This invention relates to a modular crank toy in which a driving force may be transmitted from one unit for simultaneously driving various movable elements through a set of modular transmission units.

It is an object of the present invention to provide a toy which allows children to exercise their creative ability.

It is a further object of the present invention to provide a toy which serves as a teaching device for demonstrating various mechanical systems.

It is a further object of the present invention to provide a toy which serves as a teaching device having interchangeable mechanical elements which may be assembled to construct a wide variety of mechanical systems and many different possible configurations and combinations of elements.

It is a further object of the present invention to provide visible, movable, interchangeable parts throughout the toy.

It is yet another object of the present invention to provide a modular crank toy in which the visible movable parts throughout the toy are interconnected by modular transmission elements.

It is a further object of the present invention to provide a modular crank toy which is visually attractive, which provides entertaining animation and which at the same time provides a child with an educational experience.

It is a still further object of the present invention to provide a toy of the foregoing character which is simple in construction, which is easy to use, which may be disassembled and reassembled readily, and which may be manufactured economically.

These and other further objects, features and advantages of the present invention will be apparent from the following descriptions and from the drawings.

SUMMARY OF THE INVENTION

The present invention provides for a modular crank toy for disposition on a play surface, such as a floor, table or counter top. One module of the toy is a drive unit which has a drive unit body for resting on the play surface and a rotary motion imparting element, preferably a crank, coupled with the drive unit body. There is at least one, and preferably a plurality, of rotary output elements in the drive unit body. Each such rotary output element has an axis of rotation, and each rotary output element is coupled with the rotary motion imparting element and is rotatably driven thereby. Each rotary output element includes a drive unit coupling thereon, the drive unit coupling being rotatable about the axis of rotation of the rotary output element.

The modular crank toy also includes at least two, and preferably many more, transmission modules in the form of junction units. Each junction unit includes a junction unit body and at least first and second rotary transfer elements, in the form of bevel gears, in the junction unit body. At least two gears rotate about different axes of rotation, the gears being rotatably coupled together such that rotation of one effects rotation of the other. Each junction unit includes multiple rotatable junction unit couplings, each being affixed to one of the gears or transfer elements to rotate about the same axis as the associated gear or transfer element. In this way, a rotary drive motion imposed on one junction unit coupling is transferred through the associated gear or transfer element to the second gear or transfer element and then to a second junction unit coupling.

The modular units making up the drive unit and junction units are spaced apart to create void spaces between the units. Extending across at least certain of the void spaces are elements for producing an animated display in such void spaces. The animated display-producing elements are arranged such that each of certain selected void spaces will have at least one animated display-producing element extending completely thereacross. While an assembled modular system may have certain animated display-producing elements which end in a free distal end, those animated display-producing elements which are disposed in the void spaces between the aforesaid units have one end joined to one of the couplings of the units and the other end joined to another of the couplings of the units. Each such animated display-producing element has an axis of rotation, such that rotation of each element about its axis produces the animated display. The axis of rotation of each animated display-producing element coincides with the axis of rotation of at least one of the couplings to which the animated display-producing element is joined.

The drive unit, acting through the animated display-producing elements, which act as drive shafts, impart motion to most of the elements making up the modular system. In this regard, at least one of the animated display-producing elements will be coupled at one end with a drive unit coupling and at the other end with one of the rotatable junction unit couplings, such that the axes of rotation of the drive unit coupling, the animated display-producing element and the one associated first rotatable junction unit coupling all coincide. Most of the animated display-producing elements will be elongated and have longitudinal axes corresponding with their axes of rotation.

The modular system may include a base connector for resting on the play surface and extending across the void space between the drive unit and an adjacent junction unit to attach such units together. This base connector is disposed in a position displaced from the axis of rotation of the associated animated display-producing element to provide sufficient clearance for rotation of such element.

The modular system may also include a junction unit base support for resting on the play surface and supporting a junction unit on the play surface. This junction unit base support is coupled with the base connector and with the junction unit for securing the junction unit in a fixed position with respect to the drive unit. The junction unit base support includes a trunnion thereon for engagement with the junction unit.

Each junction unit includes a plurality of sockets or ports therein. Certain of these sockets include junction unit couplings therein, and other sockets are empty sockets devoid of such couplings. Each empty socket may receive an end of an animated display-producing element to support the animated display-producing element without transferring rotary motion to another socket. Alternatively, an empty socket may receive the trunnion of the junction unit base support to hold the junction unit body in place.

The trunnion extends vertically from the junction unit base support in perpendicular relationship thereto. This trunnion is of such size and configuration that, when the trunnion is engaged with the junction unit through a socket thereof having a junction unit coupling therein, the junction unit coupling may rotate freely with respect to the trunnion, so that the junction unit base support and trunnion will remain stationary to hold the junction unit in place while the transfer elements, i.e., the gears, of the junction unit rotate.

One particular form of junction unit, which form may take the form of a sphere or a cube, includes four bevel gears disposed in perpendicular, meshed relationship with rotational axes all disposed in the same plane. In such a junction unit, the empty sockets have central axes aligned with each other, which central axes are disposed in a plane perpendicular to the plane in which the rotational axes of the four bevel gears are disposed.

BRIEF DESCRIPTION OF THE DRAWINGS

FIG. 3 is a schematic elevational view of a more complex assembly of a modular crank toy according to the present invention.

FIGS. 4A–17C are side elevations of various animated display elements used in conjunction with the modular crank toy of the present invention.

FIGS. 18–28 are side elevations of various shapes of junction units which may be used in the modular crank toy of the present invention.

FIG. 29 is a plan view, partially cut away, of a drive unit used in the modular crank toy of the present invention.

FIG. 30 is a side elevation, partially cut away, of the drive unit of FIG. 29.

FIG. 33 is an enlarged sectional view of a rotary transfer element, specifically, a bevel gear, used in the junction unit of the modular crank toy of the present invention.

FIG. 34 is a fragmentary elevational view of a socket and coupling used in the junction unit for the modular crank toy of the present invention.

FIG. 35 is an enlarged elevational view, partially cut away, of a junction unit for use in the modular crank toy of the present invention and showing, in fragmentary form, the end of an animated display element coupled therewith.

FIG. 36 is an enlarged end view of one end of an animated display element for use in the modular crank toy of the present invention.

FIG. 37 is an enlarged fragmentary sectional view of a connecting end of an animated display element for use in the modular crank toy of the present invention.

FIG. 38 is an enlarged fragmentary sectional view of an empty socket 46 in a junction unit for the modular crank toy of the present invention.

FIG. 39 is an enlarged fragmentary elevational view of the socket of FIG. 38.

FIG. 40 is an enlarged elevational view, partly in section, of a junction unit for use in the modular crank toy of the present invention and showing a pair of connecting ends of animated display elements coupled therewith.

DETAILED DESCRIPTION OF THE PREFERRED EMBODIMENTS

Figure 1:
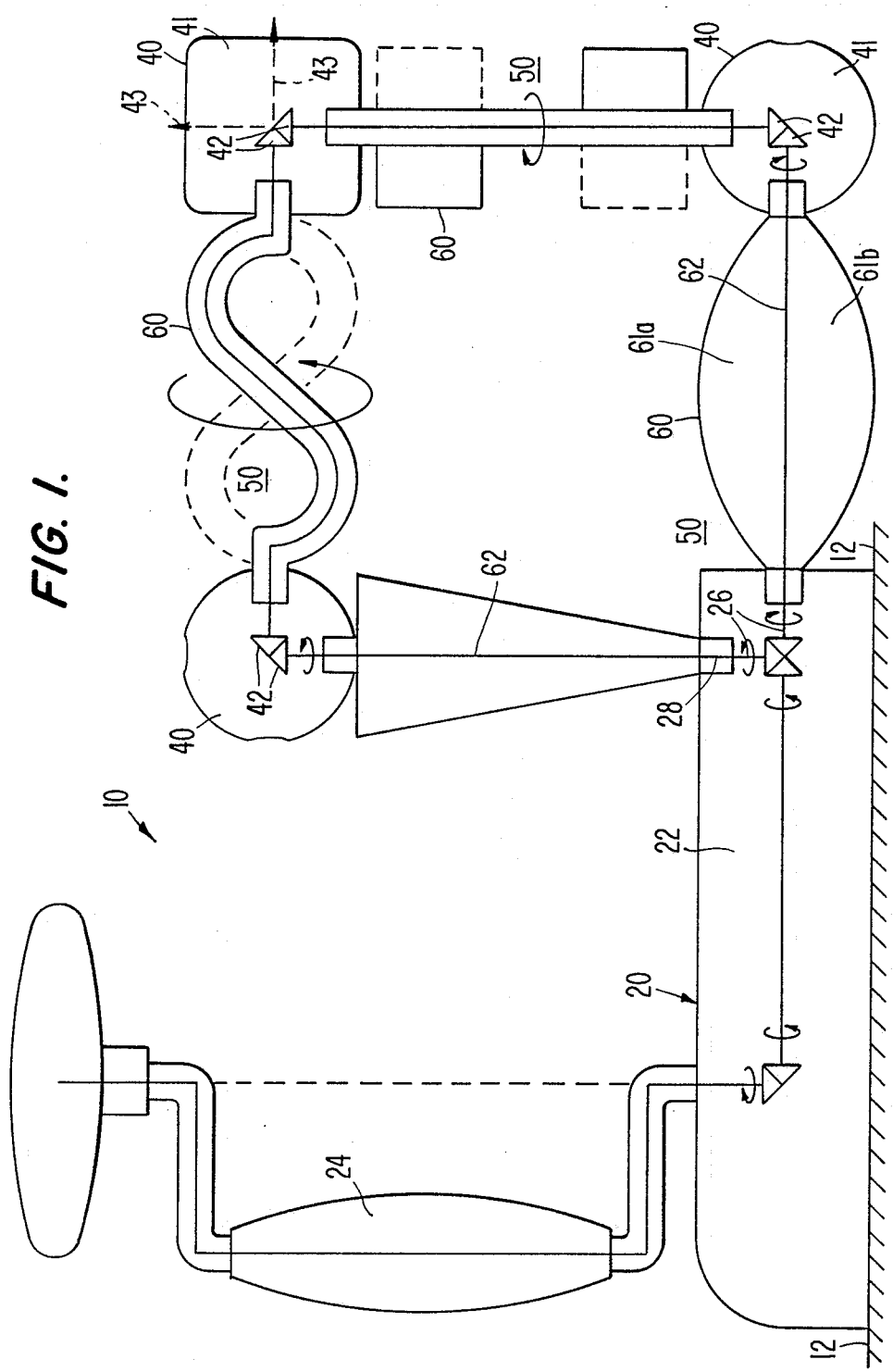
FIG. 1 is a side elevation, partly in schematic form, showing an assembled modular crank toy according to the present invention.

In the following description, and in the drawings, like reference characters used among the various figures of the drawings refer to like elements or features.

Figure 2:
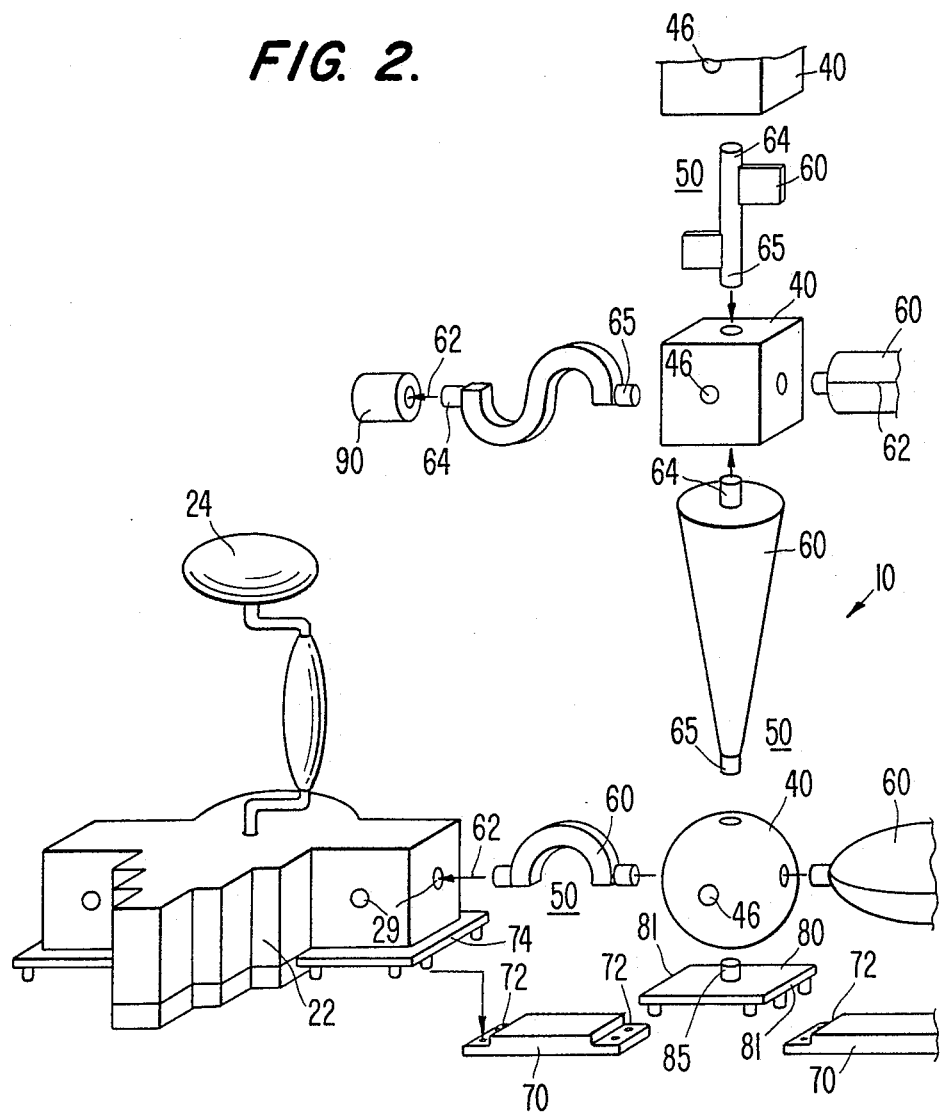
FIG. 2 is a perspective view, partially cut away, of a modular crank toy according to the present invention assembled in a manner different from the toy of FIG. 1.

Reference numeral 10 generally refers to an assembled modular crank toy as best seen in FIGS. 1–3. Modular crank toy 10 will normally be disposed upon a play surface 12, such as a floor, counter top, or table top.

Modular crank toy 10 includes a drive unit 20 having a drive unit body 22 which is preferably constructed of a brightly colored plastic. The drive unit body 22 rests upon play surface 12. A rotary motion imparting element, which preferably takes the form of a hand crank 24, is disposed in drive unit body 22 to provide motive force to the modular toy. Hand crank 24 is also preferably constructed of a brightly colored plastic, and its different parts may be of different colors to provide visual interest and attractiveness to children.

Drive unit 20 also includes a set of rotary output elements 26. In the particular preferred embodiments of the present invention as shown and described herein, there are six such rotary output elements 26 as best seen in FIGS. 2 and 29. Each rotary output element 26 includes an axis of rotation 28. Rotary output elements 26 are disposed in sockets or ports 29 which provide access from the outside of drive unit body 22 to the internally located rotary output elements 26. Also within sockets 29 are drive unit couplings 30 through which rotary output elements 26 may be coupled with additional elements of the modular crank toy. Drive unit coupling 30 is rotatable about the axis of rotation 28 of rotary output element 26.

Modular crank toy 10 also includes multiple junction units 40 to aid in the transmission of rotary motion from one element to another in the assembled modular crank toy. Details of a particular cube-shaped junction unit are shown in FIGS. 35 and 40. As will be seen from FIGS. 1–3, however, junction units 40 may take many different forms in the assembled unit. A sampling of individual shapes for junction units 40 are shown in FIGS. 18–28.

Each junction unit 40 includes a junction unit body 41 which houses the various components of each junction unit 40. As with the other visible components of modular crank toy 10, junction unit body 41 is preferably constructed of a brightly colored plastic.

Housed within junction unit body 41 are a set of rotary transfer elements which, in the particular embodiments of the invention shown and described herein, take the form of bevel gears 42. Bevel gears 42 are in intermeshing relationship with each other as best seen in FIG. 40 and rotate about multiple axes of rotation 43. Preferably, at least one of the axes of rotation 43 will be at right angles to at least one other such axis 43. It will be seen that rotation of one bevel gear 42 effects rotation of the other bevel gears 42 within each junction unit 40.

Each rotary transfer element 42 terminates in a rotatable junction unit coupling 44, i.e., coupling 44 is affixed to each transfer element or bevel gear 42 and may be integral therewith. Each junction unit coupling 44 rotates about the same axis 43 as the transfer element or bevel gear 42 to which it is affixed. Thus, a rotary drive motion imposed upon one junction unit coupling is transferred through the associated bevel gear 42 to another of the bevel gears 42 and thence to another junction unit coupling 44 associated with that other bevel gear 42.

Each rotatable junction unit coupling 44 is disposed in a socket or port 45 similar to sockets 29 of the drive unit 20. In additional to sockets 45 for providing access to rotatable junction unit couplings 44, each junction unit 40 may also have empty sockets or ports 46 which may be used for anchoring junction unit 40 in a desired position or may be used as a terminus for another rotatable element when it is not desired to transmit the rotary motion of that element to another element.

It will be seen that bevel gears 42 are rotatable about bearings 47 disposed within junction unit body 41. It will also be seen from FIG. 38 that each empty socket 46 in junction unit 40 ends in a receptacle 48 with a shape resembling a slightly oblong sphere having different radii 49a, 49b which begin at centers which are slightly spaced apart axially.

In an assembled modular crank toy 10, different versions of which are shown in FIGS. 1-3, void spaces 50 will exist between pairs of junction units 40 or between a junction unit 40 and drive unit 20.

Extending across at least certain of void spaces 50 are animated display elements 60 which produce a rotating animated display in void spaces 50. Animated display elements 60 may take many different forms so as to provide visual interest and variety as elements 60 rotate in void spaces 50. A sampling of some different forms of animated display elements 60 are depicted in FIGS. 4A-17C. Those figures of the drawings designated with the letter "A", such as FIGS. 4A, 5A, 6A, etc., show a long form of a particular shape of the animated display element. Those figures designated with the letter "B", such as FIGS. 4B, 5B, 6B, etc., show animated display elements 60 of intermediate length. Those figures designated with the letter "C", such as FIGS. 4C, 5C, 6C, etc., depict animated display elements 60 which are relatively short in the direction of their rotational axes 62. It will be seen from FIGS. 1-17C that the majority of animated display elements 60 are elongated and have longitudinal axes coinciding with their axes of rotation 62.

As with other visible elements of the modular crank toy 10, animated display elements are preferably constructed of colorful plastic. Many of the animated display elements 60 have eccentric portions to provide visual interest and attractiveness to children as they rotate. Some of the animated display elements, particularly those that are symmetrical, may have different sections, such as sections 61A and 61B of the animated display elements shown in FIGS. 1, 6A, 6B and 6C. This also enhances the visual interest and attractiveness to children of the display elements 60, particularly as they rotate when motion is imparted to the overall modular crank toy 10 through drive unit 20.

Each animated display element 60 includes at least one connecting end 64 to be joined with either the drive unit 20 or junction unit 40. In most instances, the animated display element 60 will include a pair of connecting ends 64, 65. Each connecting end may include a head 66 as shown in FIG. 7, which head 66 may include a tongue 67 (FIGS. 36 and 37) for cooperation with a groove 68 in the rotatable junction unit coupling 44 disposed in socket 45 of junction unit 40 (see particularly FIGS. 34 and 35.)

Some animated display elements 60 will be coupled at one end with a junction unit 40, while the other end is a free, distal end. Nonetheless, many of the animated display elements 60 will have one end joined to one of the couplings 30, 44 (i.e., a coupling in either the drive unit 20 or the junction unit 40) with the other end joined to another such coupling 30, 44. In this regard, rotation of each animated display producing means about its axis 62 emanates from drive unit 20 and is transmitted throughout the modular crank toy 10 by animated display elements 60, which serve as drive shafts or axles, and by junction units 40, which serve as transmission or gear box devices. That is, turning of hand crank 24 of drive unit 20 imparts rotary motion to all of the animated display elements 60 immediately coupled to unit 20. This, in turn, transmits rotary motion to all of the other animated display elements 60 of the overall system of the various versions of modular crank toy 10 as shown in FIGS. 1-3.

It will be appreciated and understood that the particular versions of modular crank toy 10 as shown in FIGS. 1-3 represent samples only, and that the particular version in use at any one time by the user will be subject to variation at will by the user. The modular crank toy of the present invention is a construction toy, in which the user is encouraged to disassemble and reassemble the individual elements often into many different creative and interesting combinations and variations. All of the major components of modular crank toy 10 snap together easily for creative assembly and are detachable from each other easily to facilitate creation of many variations.

Modular crank toy 10 may also employ a base connector 70 for resting on play surface 12 and extending across one or more of the void spaces 60 between units 20, 40 to provide a track or base upon which the modular crank toy is built. Thus, units 20, 40 are coupled with base connector 70 for securing such units 20, 40 in fixed positions with respect to each other.

Figure 31:
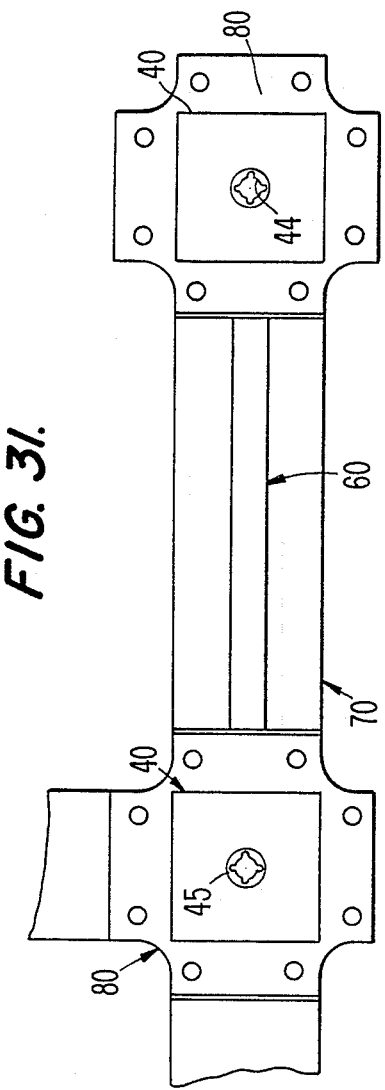
FIG. 31 is a plan view, partially cut away, showing a pair of junction units joined together by a base connector and with an animated display element extending between the two junction units.
Figure 32:
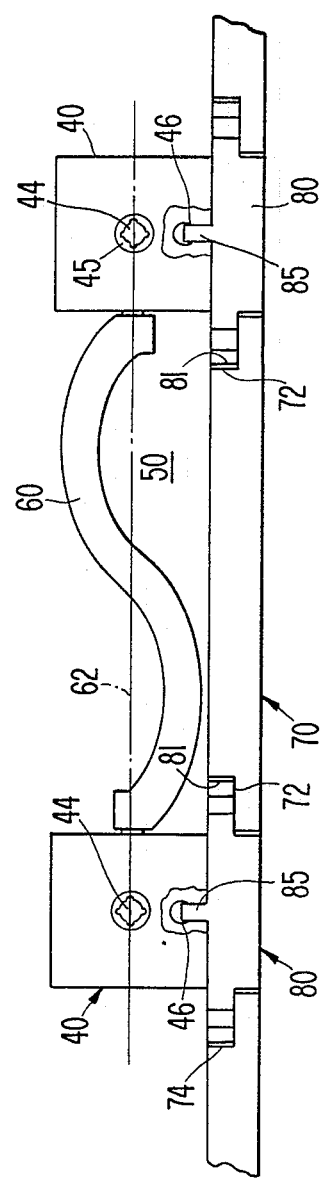
FIG. 32 is a side elevation of the subassembly of FIG. 31.

Base connector 70 is best seen in FIGS. 2, 31 and 32. As seen there, base connector 70 includes interfitting edges 72, one of which may be joined with a mating, interfitting edge 74 of drive unit 20 and snapped together using a system of holes and protrusions as illustrated. Base connector 70 may be used not only to connect a junction unit 40 to drive unit 20, but also to connect two junction units 40 together, as shown in FIGS. 31 and 32. It will be seen that base connector 70 is disposed in a position displaced from the axis of rotation 62 of the animated display element 60 in the particular void space 50 spanned by base connector 60. In this way, sufficient clearance for rotation of animated display element 60 is ensured.

Modular crank toy 10 may also include a junction unit base support 80 for resting on play surface 12 and supporting one or more junction units 40 on play surface 12. Preferably, each junction unit base support 80 has an interfitting edge 81 for coupling with base connector 70 by cooperating with the interfitting edge 72 thereof. Of course, base connector 70 is also coupled with an associated junction unit 40 via trunnion 85 for securing such junction unit in a fixed position with respect to drive unit 20 or with respect to another junction unit 40 when one or more base connectors 70 are used. In addition, or alternatively, base supports 80 may stand alone to stabilize certain of the junction units 40 with respect to the play surface 12.

The particular way in which the base connectors 70 are joined to the drive unit 20 and the way in which base connectors 70 and base supports 80 are joined together may take many forms. The presently preferred type of joint is illustrated in FIG. 29 in connection with the drive unit. Another form of connection is shown in FIG. 2.

As indicated, each base support 80 includes a trunnion 85 therein for engagement with junction unit 40. Trunnion 85 extends vertically from base support 80 in perpendicular relationship thereto. Trunnion 85 is of such size and configuration that, when trunnion 85 is engaged with junction unit 40 through a socket 45 thereof having a rotatable junction unit coupling 44 therein, such coupling 44 may rotate freely with respect to the trunnion 85 so that base support 80 and trunnion 85 will remain stationary to hold junction unit 40 in place while the bevel gears 42 of junction unit 40 rotate. Alternatively, trunnion 85 may be received in an empty socket 46 of junction unit 40 to hold junction unit body 41 in place.

As previously indicated, not every animated display element will be disposed in a void space 50 between units 20, 40. Some animated display elements will be connected to one of such units 20, 40 at one end only, the other end being a free distal end. In such an instance, it is desirable to attach an end piece 90 to free connecting end 65 of such animated display element 60 for enhanced visual attractiveness and visual interest.

It is contemplated that certain of the display elements 60 will be designed specifically for positions in the system where they will not transfer rotary motion to an adjoining junction unit. That is, some display elements will be initially designed to have a free end or free side during use. In such instances, the display element will have only one connecting end, similar to connecting end 64 or 65, and of course will not require an end piece 90. A display element 60 of this kind can be designed to be visually stimulating even without rotary movement. Such a display element may be placed in an empty socket 46, in which case it will not rotate with the other animated display elements.

As with the other visible elements, it is preferable that base connectors 70, base supports 80, and end pieces 90 be constructed of colorful plastic.

It will be understood that, just as junction units 40 include rotary transfer elements in the form of bevel gears 42, similar elements will be found in drive unit 20. Specifically, rotary motion from hand crank 24 is transmitted through drive unit body 22 to rotary output elements 26 by a series of drive unit shafts 92 and drive unit bevel gears 93.

Thus, there has been described and shown herein an articulated building system of modular elements including a drive unit 20 and junction units 40 with connecting animated drive shafts in the form of animated display elements 60 which derive their speed and power of movement from a master hand manipulated crank 24 in drive unit 20.

The drive units and junction units 40 are equipped with sockets or ports 29, 45 which receive connecting ends 64, 65 of animated display elements 60. The special construction of the ends 64, 65 of elements 60 (see FIGS. 33-39) allow them to be repeatedly inserted into and removed from the sockets. Once a connection is completed between the drive unit 20 and a junction unit 40 via an animated display element 60, a construction with visible turning elements can be developed horizontally and/or vertically by continuing the connection of junction units 40 to each other via animated display elements 60. As indicated, an animated display element 60 having only one end connected to a junction unit 40 may be "capped" by a decorative end piece 90.

Building outward from drive unit 20, all base level horizontal connections between units 20, 40 and animated display elements 60 (i.e. all connections at the level of the play surface 12) are laid out, for stability, on a track composed of such base level components and base connectors 70 and base supports 80. Junction units 40 are mounted directly onto base supports 80 while base connectors 70 are connected to mating components beneath their corresponding animated display elements 60.

Some of the sockets in the junction units 40 are connected to internal gears 42 and are "live". "Non-geared" sockets may also be included. The turnability of the various pieces in the modular crank toy construction is dependent upon the maintenance of a "circuit". Circuits are created through direct or indirect linkage of live drive unit sockets and live junction unit sockets via animated display elements 60.

While the present invention has been described with reference to particular preferred embodiments, it will be understood that many variations, modifications and other embodiments are both possible and expected, all within the spirit and scope of the appended claims.

What is claimed is:

1. A modular toy for disposition on a play surface, the toy comprising:
   (a) a drive unit including
      (i) a drive unit body for resting on the play surface;
      (ii) a rotary motion imparting element coupled with said drive unit body;
      (iii) at least one rotary output element in said drive unit body, said rotary output element having an axis of rotation, said rotary output element being coupled with said rotary motion imparting element and being rotatably driven thereby; and
      (iv) a drive unit coupling on said rotary output element, said drive unit coupling being rotatable about the axis of rotation of said rotary output element,
   (b) at least two junction units, each junction unit including
      (i) a junction unit body;
      (ii) at least first and second rotary transfer elements in said junction unit body which transfer elements rotate about different axes of rotation, said rotary transfer elements being rotatably coupled together such that rotation of one transfer element effects rotation of the other transfer element;
      (iii) at least first and second rotatable junction unit couplings, said first junction unit coupling being affixed to said first transfer element, said second junction unit coupling being affixed to said second transfer element, such that said first junction unit coupling rotates about the same axis as said first transfer element and said second junction unit coupling rotates about the same axis as said second transfer element, whereby a rotary drive motion imposed on said first junction unit coupling is transferred through said first transfer element to said second transfer element and thence to said second junction unit coupling, (c) said drive unit and said junction units being spaced apart to create void spaces between said units; and (d) a plurality of means, extending completely across at least certain of said void spaces, for producing an animated display in said certain void spaces, said animated display producing means being arranged such that all animated display producing means extending across said certain void spaces rotate in their entireties as a result of being coupled with a pair of said units, which pair of units are selected from among the units of said drive unit and said junction unit, each animated display producing means extending across said certain void spaces having a pair of ends, one end being joined to one of said couplings of said pair of units, the other end being joined to another of said couplings of said pair of units, each animated display producing means having an axis of rotation, such that rotation of each animated display producing means about its axis produces the animated display, the axis of rotation of each animated display producing means coinciding with the axis of rotation of at least one of the couplings to which the animated display producing means is joined.

2. A modular toy as defined in claim 1, wherein one of said animated display producing means is coupled at one end with said drive unit coupling and at the other end with said first rotatable junction unit coupling such that the axes of rotation of said drive unit coupling, said one animated display producing means and said first rotatable junction unit coupling all coincide.

3. A modular toy as defined in claim 2, wherein said one animated display producing means is elongated and has a longitudinal axis coinciding with its axis of rotation.

4. A modular toy as defined in claim 1 further comprising a stationary connector for resting on the play surface and extending across the void space between the drive unit and first junction unit to connect such units together, said base connector being disposed in a position displaced from the axis of rotation of said one animated display producing means to provide sufficient clearance for rotation of said animated display producing means.

5. A modular toy as defined in claim 4 further comprising a stationary junction unit base support for resting on the play surface and supporting said first junction unit on the play surface, said junction unit base support being coupled with said base connector and with said junction unit for securing said first junction unit in a fixed position with respect to said drive unit, said junction unit base support including a trunnion thereon for engagement with said first junction unit.

6. A modular toy as defined in claim 5, wherein said first junction unit body includes a plurality of sockets therein, wherein certain of said sockets each include one of said junction unit couplings therein and wherein certain other of said sockets are empty sockets devoid of junction unit couplings, whereby each empty socket may receive an end of an animated display producing means to support the animated display producing means without transferring rotary motion thereof to another socket and, alternatively, whereby an empty socket may receive said trunnion of said junction unit base support to hold said junction unit body in place.

7. A modular toy as defined in claim 6, wherein said trunnion extends vertically from said junction unit base support in perpendicular relationship thereto, said trunnion being of such size and configuration that, when said trunnion is engaged with said junction unit through a socket thereof having a junction unit coupling therein, said junction unit coupling may rotate freely with respect to said trunnion, so that said junction unit base support and trunnion will remain stationary to hold said junction unit in place while the transfer elements of said junction units rotate.

8. A modular toy figure as defined in claim 1 further comprising a stationary junction unit base support for resting on the play surface and coupled with said first junction unit for supporting said first junction unit on the play surface, said junction unit base support including a trunnion thereon for engagement with said first junction unit.

9. A modular toy as defined in claim 8, wherein said first junction unit body includes a plurality of sockets therein, wherein certain of said sockets each include one of said junction unit couplings therein and wherein certain other of said sockets are empty sockets devoid of junction unit couplings, whereby each empty socket may receive an end of an animated display producing means to support the animated display producing means without transferring rotary motion thereof to another socket and, alternatively, whereby an empty socket may receive said trunnion of said junction unit base support to hold said junction unit body in place.

10. A modular toy as defined in claim 9, wherein said trunnion extends vertically from said junction unit base support in perpendicular relation ship thereto, said trunnion being of such size and configuration that, when said trunnion is engaged with said junction unit through a socket thereof having a junction unit coupling therein, said junction unit coupling may rotate freely with respect to said trunnion, so that said junction unit base support and trunnion will remain stationary to hold said junction unit in place while the transfer elements of said junction units rotate.

11. A modular toy as defined in claim 9, wherein said rotary transfer elements in each junction unit include four bevel gears disposed in perpendicular, meshed relationship with rotational axes all disposed in the same plane and wherein said empty sockets have central axes aligned with each other, which central axes are disposed in a plane perpendicular to the plane in which the rotational axes of said four bevel gears are disposed.

12. A modular toy as defined in claim 1, wherein said rotary transfer elements in each unit include at least a pair of bevel gears disposed in perpendicular, meshed relationship.

13. A modular toy as defined in claim 1, wherein said rotary motion imparting element is a hand crank.

14. A modular toy for disposition on a play surface, the toy comprising:
(a) a drive unit including
(i) a drive unit body for resting on the play surface;
(ii) a rotary motion imparting element coupled with said drive unit body;
(iii) at least one rotary output element in said drive unit body, said rotary output element having an axis of rotation, said rotary output element being coupled with said rotary motion imparting element and being rotatably driven thereby; and
(iv) a drive unit coupling on said rotary output element, said drive unit coupling being rotatable about the axis of rotation of said rotary output element, (b) at least two junction units, each junction unit including
   (i) a junction unit body;
   (ii) at least first and second rotary transfer elements in said junction unit body which transfer elements rotate about different axes of rotation, said rotary transfer elements being rotatably coupled together such that rotation of one transfer element effects rotation of the other transfer element;
   (iii) at least first and second rotatable junction unit couplings, said first junction unit coupling being affixed to said first transfer element, said second junction unit coupling being affixed to said second transfer element, such that said first junction unit coupling rotates about the same axis as said first transfer element and said second junction unit coupling rotates about the same axis as said second transfer element, whereby a rotary drive motion imposed on said first junction unit coupling is transferred through said first transfer element to said second transfer element and thence to said second junction unit coupling,
(c) said drive unit and said junction units being spaced apart to create void spaces between said units;
(d) a plurality of means, extending across at least certain of said void spaces, for producing an animated display in said certain void spaces, said animated display producing means being arranged such that each of said certain void spaces will have at least one animated display producing means extending completely thereacross, each animated display producing means extending across said certain void spaces having a pair of ends, one end being joined to one of said couplings, the other end being joined to another of said couplings, each animated display producing means having an axis of rotation, such that rotation of each animated display producing means about its axis produces the animated display, the axis of rotation of each animated display producing means coinciding with the axis of rotation of at least one of the couplings to which the animated display producing means is joined;
(e) a stationary junction unit base support for resting on a play surface and coupled with one of said junction units for supporting said one junction unit in a stationary position on the play surface.

15. A modular toy as defined in claim 14, wherein said junction unit base support includes a trunnion thereon for engagement with said one junction unit.

16. A modular toy as defined in claim 14 further comprising a stationary base connector for resting on the play surface and extending across the void space between the drive unit and said one junction unit to connect such units together, one of said animated display producing means being coupled at one end with said drive unit coupling and at the other end with said first rotatable motion unit coupling of said one junction unit, said base connector being disposed in a position displaced from the axis of rotation of said one animated display producing means to provide sufficient clearance for rotation of said animated display producing means.

17. A modular toy as defined in claim 16, wherein said junction unit base support is coupled with said base connector and with said junction unit for securing said first junction unit in a fixed position with respect to said drive unit.

* * * * *